US011359969B2

United States Patent
Shayne et al.

(10) Patent No.: US 11,359,969 B2
(45) Date of Patent: Jun. 14, 2022

(54) TEMPERATURE REGULATION BASED ON THERMAL IMAGING

(71) Applicant: ObjectVideo Labs, LLC, Tysons, VA (US)

(72) Inventors: Ethan Shayne, Clifton Park, NY (US); Donald Gerard Madden, Columbia, MD (US)

(73) Assignee: ObjectVideo Labs, LLC, Tysons, VA (US)

(*) Notice: Subject to any disclaimer, the term of this patent is extended or adjusted under 35 U.S.C. 154(b) by 0 days.

(21) Appl. No.: 17/164,014

(22) Filed: Feb. 1, 2021

(65) Prior Publication Data

US 2021/0239534 A1 Aug. 5, 2021

Related U.S. Application Data

(60) Provisional application No. 62/968,420, filed on Jan. 31, 2020.

(51) Int. Cl.

| | |
|---|---|
| *G01J 5/02* | (2022.01) |
| *H04N 5/33* | (2006.01) |
| *G01J 5/08* | (2022.01) |
| *F24F 11/80* | (2018.01) |
| *G01J 5/00* | (2022.01) |

(52) U.S. Cl.
CPC ............. *G01J 5/025* (2013.01); *F24F 11/80* (2018.01); *G01J 5/0859* (2013.01); *H04N 5/33* (2013.01); *G01J 5/0265* (2013.01); *G01J 2005/0077* (2013.01)

(58) Field of Classification Search
None
See application file for complete search history.

(56) References Cited

U.S. PATENT DOCUMENTS

| | | | | |
|---|---|---|---|---|
| 10,847,009 | B1* | 11/2020 | Sulucz ................ | G08B 17/125 |
| 2003/0050737 | A1* | 3/2003 | Osann, Jr. ............ | H04L 67/125 |
| | | | | 700/276 |
| 2008/0056568 | A1* | 3/2008 | Porikli ............ | G08B 13/19604 |
| | | | | 382/173 |
| 2012/0219211 | A1* | 8/2012 | Ding .................... | G06K 9/4642 |
| | | | | 382/159 |
| 2013/0314536 | A1* | 11/2013 | Frank .................. | H04N 5/2257 |
| | | | | 348/148 |

(Continued)

OTHER PUBLICATIONS

Cao et al., "Smart sensing for HVAC control: Collaborative intelligence in optical and IR cameras," IEEE Transactions on Industrial Electronics, Dec. 2018, 65:(12) 9785-9794.

(Continued)

*Primary Examiner* — Stefan Gadomski
(74) *Attorney, Agent, or Firm* — Fish & Richardson P.C.

(57) ABSTRACT

Systems and techniques are described for using thermal imaging to configure and/or augment temperature regulation operations within a property. In some implementations, a computing device obtains a thermal image of a region of a property. The thermal image identifies at least a surface within the region. A surface temperature of the surface is determined. An ambient temperature for the region is determined based at least on the surface temperature. The one or more temperature controls for the region are adjusted based at least on the ambient temperature.

13 Claims, 8 Drawing Sheets

(56) References Cited

U.S. PATENT DOCUMENTS

| | | | | |
|---|---|---|---|---|
| 2014/0093133 | A1* | 4/2014 | Frank | G06K 9/00838 |
| | | | | 382/104 |
| 2014/0112537 | A1* | 4/2014 | Frank | G01V 8/10 |
| | | | | 382/103 |
| 2014/0148706 | A1* | 5/2014 | Van Treeck | A61B 5/0077 |
| | | | | 600/474 |
| 2015/0161779 | A1* | 6/2015 | Hamann | G06T 3/0043 |
| | | | | 348/165 |
| 2015/0189195 | A1* | 7/2015 | Hamann | H04N 5/33 |
| | | | | 348/165 |
| 2015/0248754 | A1* | 9/2015 | Graner | G06K 9/00771 |
| | | | | 382/103 |
| 2016/0116178 | A1 | 4/2016 | Vega | |
| 2016/0320085 | A1* | 11/2016 | Silawan | F24F 11/30 |
| 2016/0341603 | A1* | 11/2016 | Kusukame | G01J 5/02 |
| 2017/0088098 | A1* | 3/2017 | Frank | G06K 9/00362 |
| 2017/0328997 | A1 | 11/2017 | Silverstein et al. | |
| 2019/0026908 | A1* | 1/2019 | Finn | G06T 7/254 |
| 2019/0032950 | A1 | 1/2019 | Nakamura et al. | |
| 2019/0200872 | A1* | 7/2019 | Matsuoka | A61B 5/0013 |
| 2019/0212760 | A1* | 7/2019 | Tiwari | G06Q 10/08 |
| 2019/0309968 | A1* | 10/2019 | Nalajala | F24F 11/30 |
| 2019/0310137 | A1* | 10/2019 | Pop | G01J 5/0096 |
| 2019/0387185 | A1* | 12/2019 | Hicks | H04N 5/33 |
| 2020/0090477 | A1* | 3/2020 | Monge Nunez | G06K 9/00536 |

OTHER PUBLICATIONS

PCT International Search Report and Written Opinion in International Appln. No. PCT/US2021/016073, dated Apr. 26, 2021, 9 pages.

\* cited by examiner

500

OBTAIN A THERMAL IMAGE OF A SURFACE ASSOCIATED WITH A REGION OF A PROPERTY
510

DETERMINE A SURFACE TEMPERATURE OF THE SURFACE
520

DETERMINE AN AMBIENT TEMPERATURE FOR THE REGION
530

PERFORM AN OPERATION
540

TEMPERATURE REGULATION BASED ON THERMAL IMAGING

CROSS-REFERENCE TO RELATED APPLICATIONS

This application claims the benefit of U.S. Provisional Patent Application No. 62/968,420, filed Jan. 31, 2020, which is incorporated herein by reference in its entirety.

TECHNICAL FIELD

This disclosure relates to home monitoring technology.

BACKGROUND

Monitoring systems often include a thermostat to regulate ambient temperature. The thermostat can be used to manually or automatically adjust the air temperature of a property. For example, a user can use the thermostat to manually adjust a set point temperature for a heating, ventilation, and air conditioning (HVAC) system of the property. In other examples, a thermostat can be configured to automatically increase or decrease set point temperature based on a temperature detected by temperature sensors placed within the property. Data collected by the thermostat can be used to maintain a specified temperature so that if the measured temperature rises or falls outside the desired threshold, the thermostat activates a cooling or heating mode of the HVAC system to adjust the temperature accordingly. In some instances, monitoring systems include stand-alone temperature sensors such as remote temperature sensors (RTS), which provide a thermostat with temperature measurements in different regions of a property.

SUMMARY

Systems and techniques are described for using thermal imaging to configure and/or augment temperature regulation operations within a property. For example, an infrared (IR) camera can collect a thermal image of a surface, and the thermal image can be processed to determine a surface temperature associated with the surface. The surface temperature can be utilized to identify an ambient temperature for a region of the property. In this way, techniques disclosed herein enable a thermostat to measure ambient temperature using techniques other than using a measured air temperature in the vicinity of the thermostat. For example, in some instances, a surface temperature can be used to adjust a baseline air temperature measured by a thermostat to permit generation of a more accurate ambient temperature measurement by the thermostat. In other instances, the surface temperature can be used in lieu of the air temperature measured by the thermostat to determine ambient temperature if, for instance, the thermostat is placed in a location of a region in which air temperature is not representative of the ambient temperature within the entire region. In some implementations, multiple surface temperatures can be measured within a region (e.g., surface temperatures collected for objects that are placed in different locations within a region) and combined to generate a comprehensive ambient temperature for the region.

Techniques disclosed herein can be used to improve upon limitations of ambient temperature detection techniques that are sometimes used by thermostats. For example, thermostats of many monitoring systems often adjust the air temperature based on comparing an ambient temperature to a designed target temperature (or a "set point temperature"). However, these temperature adjustment techniques may not entirely improve the comfort level of users that are located within the property. For example, a traditional thermostat often determines ambient temperature based on air temperature measured near temperature sensors of the thermostat. However, the ambient temperature measurement may not accurately reflect the air temperature of an entire region of the property (e.g., a room) if, for instance, there are large temperature variations in different parts of the region. While some monitoring systems include multiple thermostats placed in different locations to enable ambient temperature detection in each location, the multiple thermostats use the same mechanism (e.g., measuring temperature near temperature sensors) to perform temperature measurement. Other thermostats can be configured to adjust a baseline temperature measurement, but are similarly limited by the same mechanism to perform temperature measurement.

Additionally, many monitoring systems are configured such that a target temperature is assumed to have a consistent value. For instance, some thermostats sometimes automatically adjust the target temperature based on a predetermined temperature adjustment schedule regardless of underlying changes to ambient temperature. In other instances, "smart" thermostats can adjust a temperature adjustment schedule to permit more flexible and automated adjustment. However, in these instances, while the objective is adjust the ambient temperature to achieve a fixed target temperature, this may not necessary necessarily improve user comfort since a user may not necessarily consistently perceive the ambient temperature (i.e., a user's perception of ambient temperature may lead the user to believe ambient temperature has changed even though the ambient temperature actually remains the same). For example, a user's perception of ambient temperature can vary based on external factors, such as physical exertion, metabolism, among others. In this regard, ambient temperature adjustment techniques based on measured air temperatures are often inadequate to improve a user's comfort level.

Also disclosed herein is a monitoring system with components that can be configured to use thermal imaging to augment and/or improve ambient temperature detection within a property. For example, the monitoring system can include an IR camera that collects thermal images of one or more surfaces associated with a region of the property. The monitoring system can also include a thermostat and an associated heating, ventilation, and air conditioning (HVAC) unit that regulates a target temperature (or a set point temperature) within the region. The monitoring system can also include other components enabling communications between the IR camera and the thermostat, such as a control unit, sensors and appliances located within the property, a user device for a user of the property, and/or an associated server system.

In one general aspect, a method is performed by one or more computing devices. The method includes obtaining a thermal image of a region of a property. The thermal image identifies at least a surface within the region. The method also includes determining a surface temperature of the surface, determining an ambient temperature for the region based at least on the surface temperature, and adjusting one or more temperature controls for the region based at least on the ambient temperature.

One or more implementations can include the following optional features. For example, in some implementations, the thermal image includes an infrared image collected by an infrared camera located in the region.

In some implementations, the thermal image identifies a set of surfaces within the region, wherein the surface is included in the set of surfaces. The method also includes identifying a set of objects located in the region that correspond to the set of surfaces and determining an object classification for each object included in the set of objects. In such implementations, selecting, from among the set of surfaces, a surface for use in determining the ambient temperature for the region and determining the ambient temperature for the region includes determining the ambient temperature based on a surface temperature of the surface that was selected, from among the set of surfaces, for use in determining the ambient temperature for the region.

In some implementations, selecting, from among the set of objects, a subset of objects predicted to be interacted with by a user associated with the property, where the subset of objects are selected based on object classifications determined for the set of objects. In such implementations, determining a set of surface temperatures that includes a respective surface temperature for each object included in the subset of objects and determining the ambient temperature for the region includes determining the ambient temperature based on the set of surface temperatures.

In some implementations, selecting the subset of objects predicted to be interacted with by the user includes additional operations. The operations include obtaining historical activity data associated with the property, where the historical activity data identifies a set of interactions of the user with each object included in the set of objects. The operations also include determining, based on the historical activity, a respective number of interactions for each object included in the set of objects, and selecting the subset of objects based on numbers of interactions determined for objects included in the set of objects.

In some implementations, object classifications of objects included in the subset of objects indicate the subset of objects as representing furniture.

In some implementations, the method further includes obtaining, from a wearable device of a user associated with the property, data indicating a present condition of the user, determining a temperature preference of the user based on the present condition, and adjusting the one or more temperature controls for the region comprises adjusting the one or more temperature controls based on the ambient temperature and the temperature preference.

In some implementations, obtaining data indicating the present condition of the user includes obtaining data indicating (i) a surface temperature of the user and (ii) that the user exercised within a predetermined time period, wherein the surface temperature of the user is equal to a set point temperature of a thermostat located in the region. In such implementations, determining the temperature preference of the user includes determining a preference for a lower ambient temperature based on obtaining data indicating that the user exercised within the predetermined time period. Additionally, adjusting the one or more temperature controls for the region includes providing an instruction to an HVAC system of the property that, when received by the HVAC system, causes the HVAC system to initiate a cooling operation associated with the region.

In some implementations, determining the ambient temperature for the region includes determining a baseline ambient temperature based on the surface temperature, determining to lower the baseline ambient temperature based on the preference for the lower ambient temperature, and determining the ambient temperature for the region by lowering the baseline ambient temperature.

In some implementations, the thermal image identifies a second surface within the region. The method also includes determining a second surface temperature of the second surface. Additionally, determining the ambient temperature for the region includes determining an aggregate surface temperature for the region based on combining the surface temperature and the second surface temperature, and determining the ambient temperature based on the aggregate surface temperature.

In some implementations, determining the aggregate surface temperature for the region includes determining that the surface temperature of the surface satisfies a predetermined threshold and determining the aggregate surface temperature by biasing a value of the ambient temperature towards a value of the second surface temperature based on the surface temperature being determined to satisfy the predetermined threshold.

In some implementations, determining that the surface temperature of the surface satisfies the predetermined threshold includes determining that a value of the surface temperature exceeds a value of the predetermined threshold. Additionally, determining the aggregate surface temperature by biasing the value of the ambient temperature towards the value of the second surface temperature includes determining that the surface temperature is likely to be too hot for user interaction based on the value of the surface temperature exceeding the value of the predetermined threshold, and biasing the value of the ambient temperature towards the value of the second surface temperature by assigning a first weight to the surface temperature and a second weight to the second surface temperature, where the second weight exceeds the first weight.

In some implementations, adjusting the one or more temperature controls for the region includes adjusting a set point temperature of a thermostat located in the region.

In some implementations, adjusting the one or more temperature controls for the region includes providing, to an HVAC system associated with the property, an instruction that, when received by the HVAC system, causes the HVAC system to initiate a heating operation associated with the region or a cooling operation associated with the region.

In some implementations, the method further includes determining that the ambient temperature is greater than a set point temperature of a thermostat located in the region. In such implementations, the instruction causes the HVAC system to initiate the cooling operation associated with the region.

In some implementations, the method further includes determining that the ambient temperature is less than a set point temperature of a thermostat located in the region. In such implementations, the instruction causes the HVAC system to initiate the heating operation associated with the region.

Implementations of the described techniques may include hardware, a method or process implemented at least partially in hardware, or a computer-readable storage medium encoded with executable instructions that, when executed by a processor, perform operations.

The details of one or more implementations are set forth in the accompanying drawings and the description below. Other features will be apparent from the description and drawings.

DESCRIPTION OF DRAWINGS

In the drawings, like reference numbers represent corresponding parts throughout.

DETAILED DESCRIPTION

Figure 1A:
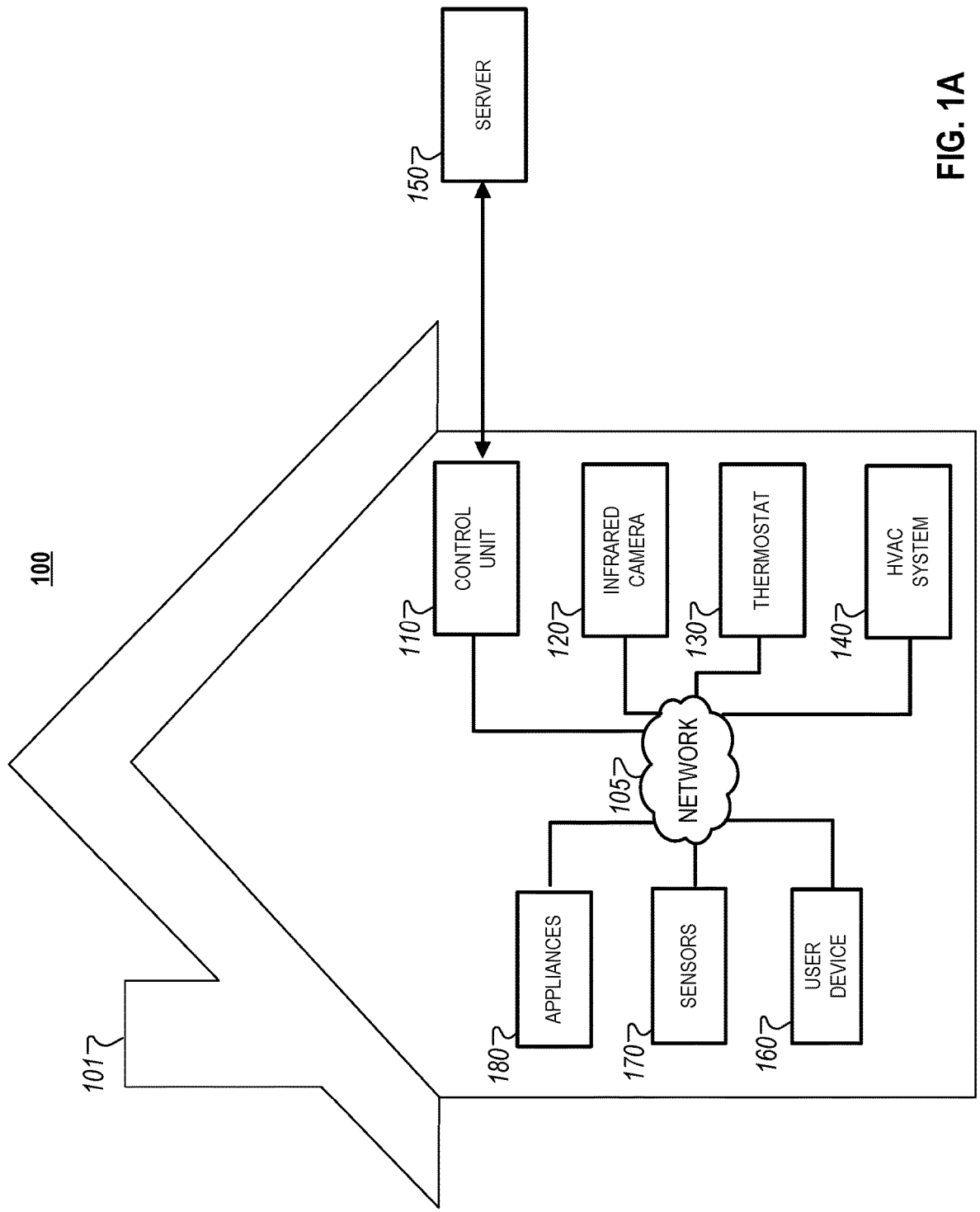
FIG. 1A illustrates an example of a system that is capable of using thermal imaging to configure temperature regulation operations of a monitoring system.

In general, systems and techniques are described for using thermal imaging to configure and/or augment temperature regulation operations within a property. For example, an IR camera can collect a thermal image of a surface, and the thermal image can be processed to determine a surface temperature associated with the surface. The surface temperature can be utilized to identify an ambient temperature for a region of the property. In this way, techniques disclosed herein enable a thermostat to measure ambient temperature using techniques other than using a measured air temperature in the vicinity of the thermostat.

As described throughout, "ambient temperature" refers to a temperature measured to represent an environmental temperature within a region. For instance, the ambient temperature of a room of a property can represent the internal temperature measured by a thermostat located within the room. In this example, the internal temperature can be based on air temperature measured within the room, one or more surface temperatures measured for surfaces of objects located in the property, or a combination thereof.

As described throughout, "set point temperature" (or "target temperature") refers to a desired temperature used for thermostatic temperature control and/or regulation within a region. For example, the set point temperature can be used to enable or disable a thermally actuated switch that enables a thermostat to initiate a heating or cooling operation to adjust air temperature within a region.

As described throughout, "user temperature" refers to a temperature measured by a wearable remote temperature sensor (WRTS) that is worn by the user. In some instances, the "user temperature" refers to an external body temperature measured on an extremity when the WRTS is placed on the extremity, for example, a measured outside body temperature when the WRTS is placed on a user's fingers, wrist, arms, legs, foot, etc. In other instances, the "user temperature" refers to a measured temperature indicative of core body temperature that measured by a WRTS that is placed inside a cavity. For example, a WRTS can be a probe that is placed inside a user's ear, mouth, or underneath the user's armpits. In some other instances, the "user temperature" can be measured by augmenting baseline temperature measurements by the WRTS using monitoring techniques for thermal imaging and tracking a user's activity or location within a property. For example, a thermal image indicating a surface temperature of the user and/or activity data indicating an activity presently being performed by the user can be used to identify a context under which a baseline temperature is measured, and thereby make any adjustments based on the identified context (e.g., reducing a baseline temperature measurement based on surface temperature indicating a lower ambient temperature than a typically normal ambient temperature). In other examples, a surface temperature of the user and the user's present activity or location can be correlated in the process of determining a "user temperature." In such examples, the correlation can be used to further augment baseline temperature measurements (e.g., increasing a baseline temperature measurement based on the surface temperature being higher than normal, which indicates that the user is presently exercising and is confirmed by exercise data collected during the same period).

Additionally, the user temperature can be measured using any suitable temperature measurement technique, such as temporal measurement and/or tympanic measurement.

As described throughout, "real-time" refers to information or data that is collected and/or processed instantaneously with minimal delay after the occurrence of a specified event, condition, or trigger. For instance, "real-time data" refers to data, e.g., temperature data, that is processed with minimal delay after a measurement device collects or senses the data, e.g., using a temperature sensing element. The minimal delay in collecting and processing the collected data is based on a sampling rate or monitoring frequency of the measurement device, and a time delay associated with processing the collected data and transmitting the processed data to a receiving device. As an example, thermostat located in a region can measure the ambient temperature in real-time to monitor changes in the air temperature over time and/or compare the measured air temperature to a set point temperature for the region. In this example, a monitoring system can process each data packet received from the thermostat in real-time to monitor the ambient temperature relative to the set point temperature.

FIG. 1A illustrates an example of a system 100 that is capable of using thermal imaging to configure temperature regulation operations of a monitoring system. The system 100 includes a control unit 110, an IR camera 120, a thermostat 130, an HVAC system 140, a server 150, a user device 160, sensors 170, and appliances 180. The components of the system 100 exchange communications with one another over a network 105. The system 100 can be installed within a property 101 where the control unit 110, the IR camera 120, the thermostat 130, the HVAC system 140, the user device 160, the sensors 170, and the appliances 180 are located. The server 150 can be remotely located from the property 101, for example, in a data center associated with a service provider that manages and/or distributes services associated with the system 100.

In general, architecture of the system 100 permits the use of thermal imaging to configure temperature regulation operations within the property 101. For instance, using techniques described herein, the system 100 can permit the thermostat 130 to measure an ambient temperature based on processing one or more thermal images collected by the IR camera 120. As an example, the system 100 can use a thermal image collected by the IR camera 120 to determine a surface temperature of an object located in a region (e.g., a room) of the property 101. The system 100 can process the surface temperature in association with an air temperature measured by the thermostat 130 (which is also located in the region) to determine an ambient temperature for the region. The system 100 can use the ambient temperature to perform a monitoring operation, such as enabling the HVAC system 140 to perform a heating or cooling operation. In this regard, the system 100 can be used to enable the thermostat 130 to measure ambient temperature using techniques other than using a measured air temperature in the vicinity of the thermostat (e.g., by using surface temperatures of objects located in a region).

Referring now to the components of the system 100, the network 105 may be configured to enable electronic communications between electronic devices. For example, the network 105 may be configured to enable the exchange of electronic communications between the control unit 110, the IR camera 120, the thermostat 130, the HVAC system 140, the server 150, the user device 160, the sensors 170, and the appliances 180.

The network 105 may include Local Area Networks (LANs), Wi-Fi, or analog or digital wired and wireless networks. The network 105 may include multiple networks or subnetworks, each of which may include, for example, a wired or wireless data pathway. The network 105 may also include a circuit-switched network, a packet-switched data network, or any other network able to carry electronic communications (e.g., data or voice communications). For example, the network 105 may include networks based on the Internet protocol (IP), or other comparable technologies. In some examples, the network 105 may include wide area networks (WAN) of computers that receive services provided by a service provider.

The control unit 110 can be a computing device that controls aspects of monitoring operations performed by components of the system 100. The control unit 110 can include a controller and a network module. The controller can be configured to control, for example, temperature monitoring and adjustment by the thermostat 130. In some examples, the controller includes a processor or other control circuitry configured to execute instructions of a program that controls operation of the system 100. In these examples, the controller can be configured to receive input from sensors, detectors, or other devices associated with the system 100 and control operation of components of the system 100, such as a camera, a temperature sensor, an activity sensor, HVAC components, etc. For example, the controller may be configured to control operation of the network module included in the control unit 110.

The network module of the control unit 110 can be a communication device configured to exchange communications over the network 105. The network module can be a wireless communication module configured to exchange wireless communications over the network 105. For example, the network module can be a wireless communication device configured to exchange communications over a short-range wireless network. The network module can also be configured to exchange communications over the network 105 using a wireless connection. For instance, the network module can enable the control unit 110 to exchange communications with the server 150 over the network 105 without the use of the network 105. The wireless communication device can include one or more GSM modules, a radio modem, a cellular transmission module, or any type of module configured to exchange communications in one of the following formats: LTE, GSM or GPRS, CDMA, EDGE or EGPRS, EV-DO or EVDO, UMTS, IP, or Wi-Fi.

The network module can also may be a wired communication module configured to exchange communications over the network 105 using a wired connection. For instance, the network module can be a modem, a network interface card, or another type of network interface device. The network module can be an Ethernet network card configured to enable the control unit 110 to communicate over a local area network and/or the Internet. The network module can also be a voiceband modem configured to enable an alarm panel to communicate over the telephone lines of Plain Old Telephone Systems (POTS). In some implementations, the alarm panel may be a broadband or cellular gateway where the network module may enable the control unit 110 to communicate over the network 105.

The control unit 110 can communicate with devices located in the property 101, such as the IR camera 120, the thermostat 130, the HVAC system 140, the user device 160, the sensors 170, and the appliances 180. The control unit 110 can wirelessly transmit data generated from devices located in the property to the server 150 over the network 105. In some instances, the control unit 110 may periodically receive data activity reports from the devices located in the property 101 that include information related to the property, e.g., occupancy data, activity data, movement data, temperature data, among others. In such instances, the control unit 110 may process or store the periodically received activity reports (e.g., determining whether to initiate a heating or cooling operation by the HVAC system 140) and/or transmit the activity reports to the server 150 for further processing or storage.

In addition, the control unit 110 can periodically receive data collected by the IR camera 120 and the thermostat 130. For example, the control unit 110 can receive temperature data from the thermostat 130 that indicates a measured air temperature within the property 101, and thermal image data from the IR camera 120 that indicates surface temperatures for objects located in the property 101. As discussed below, the control unit 110 can process the received temperature data and thermal data to determine an ambient temperature, or alternatively, provide the thermal image data to the thermostat 130 to enable the thermostat 130 to determine the ambient temperature.

The IR camera 120 can be any type of device that forms a thermal image (or a heat zone image) using infrared radiation. The IR camera 120 can be configured to detect radiation in the long-infrared range of the electromagnetic spectrum (e.g., approximately between 9,000-14,000 14,000 nm) to produces images of the detected radiation, referred to as thermograms. Images collected by the IR camera 120 can used identify a surface temperature of a surface that is included in the image based on a correlation between the amount of radiation emitted by an object and the temperature of the object. For example, warm objects can stand out well against cooler backgrounds, and, as a result, a thermal image of a region collected by the IR camera 120 can be used to identify areas of the region that are hotter or cooler relative to other areas that are within a field of view of the IR camera 120.

Thermal images collected by the IR camera 120 (or thermograms) can represent visual displays of the amount of infrared energy emitted, transmitted, and/or reflected by an imaged object. The IR camera 120 (or some other component, such as the control unit 110 or the server 150) can be configured to implement algorithms that interpret raw data (e.g., multiple sources of the infrared energy emitted from an object) to determine emissivity attributable to thermal radiation emitted from an object, which is then used to determine a surface temperature of the object.

The thermostat 130 can be a dynamically programmable temperature regulator, e.g., a thermostat that is configured to monitor air temperature within one or multiple regions within the property 101. In some instances, the thermostat 130 is an integrated component of temperature monitoring device that that receives user input indicating a set point temperature that is transmitted to the control unit 110 and/or a HVAC system 140 of the property 101. In other instances, the thermostat 130 can be a separate aftermarket device that is configured to exchange data communications with the system 100 using a data transmission protocol.

In some implementations, the thermostat 130 is configured to receive data indicating a set of user preferences related to energy consumption of the HVAC system or temperature comfort within the property 101. For example, the thermostat 130 may be used to control the air temperature of the property 101 based on a set of programmable operations based on the data indicating the set of user preferences, e.g., rules specified within a set point temperature rule repository.

The thermostat 130 is configured to control the operations of a HVAC system 140 of the property 101 to regulate and/or adjust the air temperature within the property 101. For example, the thermostat 130 can transmit control signals to enable and/or disable cooling/heating operations of the HVAC system 140. The HVAC system 140 can be a control system within the property 101 that includes one or more components that perform operations related to thermal comfort, ventilation, indoor air quality and infiltration monitoring, and/or pressure maintenance. In some implementations, the HVAC system 140 can also configured to monitor energy consumption of individual system components, for example, by directly measuring the energy consumption of the HVAC system 140 components or by estimating the energy usage of the one or more HVAC system 140 components based on detecting usage of components of the HVAC system 140.

The user device 160 can be any type of computing device that is used or associated with a user in association with a property. For instance, the user device 160 can be one or more of a smartphone, wearable device, a tablet computing device, a laptop computing device, or a desktop computing device. The user device 160 can be used to allow a property owner to access, control, and/or configure the system 100 through a monitoring application. For example, the monitoring application can allow the property owner to perform various actions, such as transmitting an instruction to the thermostat 130 to adjust the set point temperature, or transmitting an instruction to the HVAC system 140 to initiate a heating or cooling operation.

A user can also use monitoring application to control the monitoring operations of system 100. For example, the user can use the monitoring application to turn the appliances 180 on and off, transmit instructions to the sensors 170 to collect and/or store sensor data, or transmit an instruction to the control unit 110 to provide locally stored data to the server 150. In some instances, the monitoring application enables a user to remote configure the components of the system 100 while he/she is away from the property. For example, if the user is currently outside of the property 101, he/she can use the monitoring application to configure the thermostat 130 to periodically check the ambient temperature within the property 101.

The sensors 170 may include various types of sensors that are placed within the property 101. For example, the sensors 170 can include a contact sensor, a motion sensor, a glass break sensor, an occupancy sensor, an activity sensor, or any other type of sensor that is typically included in a monitoring system or security system. The sensors 170 also can also include environmental sensors such as an ambient temperature sensor, a water sensor, a rain sensor, a wind sensor, a light sensor, a smoke detector, a carbon monoxide detector, an air quality sensor, etc. In some instances, the sensors 170 may include a radio-frequency identification (RFID) sensor that identifies a particular article that includes a pre-assigned RFID tag.

The appliances 180 can be home automation devices connected to the network 105 that are configured to exchange electronic communications with other devices of the system 100. The appliances 180 may include, for example, connected kitchen appliances, controllable light sources, safety and security devices, energy management devices, and/or other types of electronic devices capable of exchanging electronic communications over the network 105. In some instances, the appliances 180 may periodically transmit information and/or generated data to the control unit 110 such that the control unit 110 can automatically control the operation of the appliances 180 based on the exchanged communications. For example, the control unit 110 can operate one or more of the appliances 180 based on a fixed schedule specified by the user. In another example, the control unit 110 may enable or disable one or more of the appliances 180 based on received sensor data from the sensors 170.

The server 150 can be an electronic device configured to provide monitoring services by exchanging electronic communications with the control unit 110, the IR camera 120, the thermostat 130, and/or the user device 160 over the network 105. For example, the server 150 can be configured to monitor events (e.g., ambient temperature satisfying a threshold) that are generated by the control unit 110 and/or other devices connected over the network 105. In this example, the server 150 may exchange electronic communications with the network module included in the control unit 110 to receive information regarding events detected by the control unit 110. The server 150 can also receive information regarding events from the IR camera 120 (e.g., thermal images of a region of the property 101), or the thermostat 130 (e.g., air temperature measured for a region of the property 101).

The server 150 can store data that is used to perform temperature regulation operations, such as configuring devices to determine the ambient temperature for a region of the property 101, configuring the IR camera 120 to collect and/or process thermal images, adjusting a set point temperature of the thermostat 130, enabling a heating/cooling operation of the HVAC system 140, or transmitting communications to the user device 160. For example, the server 150 can store user data that includes a set point temperature specified by a user, among other types of user preferences, e.g., preferred temperatures at different times during the day, preferred energy consumption levels, etc. The user-specified set point temperature can represent an ambient temperature that the user has indicated to represent his/her optimal comfort level.

In some implementations, the server 150 can store a rule repository that includes different rules that each configure the IR camera 120, the thermostat 130, and/or the HVAC system 140, to perform a certain type of temperature regulation operation specified by a particular rule. As an example, different rules within the rule repository can specify different magnitudes to change a present set point temperature being monitored by the thermostat 130. Additionally, the rules can each specify one or more triggers and/or conditions associated with ambient temperature measured within the property 101 that allow the components of the system 100 to perform a temperature regulation operation according to the selected rule. For example, the components of the system 100 can select a rule from the rule repository if the measured ambient temperature satisfies a trigger and/or condition associated with a rule.

In some instances, the rule repository can include different types or classifications of rules. For example, the rule repository can include general rules that are applicable to all users, e.g., rules that specify set point temperature adjustment irrespective of a measured user temperature. The rule repository can also include user-specific rules that are customized for each user, e.g., rules that specify set point temperature adjustment based on a comparison of the ambient temperature measured for a region and a set point temperature being monitored by the thermostat 130.

Though not illustrated in FIG. 1A, in some implementations, the system 100 can include a WRTS that is capable of measuring a user temperature. The WRTS can be any type of portable electronic device that includes a temperature sensor for measuring a user temperature as discussed throughout. The WRTS can be placed on different areas of a user's body to allow the measurement of user temperature using temporal measurement and/or tympanic measurement. In some instances, the WRTS is placed on a user's extremity such as a user's fingers, wrist, arms, legs, foot, etc., enabling the measurement of an outside body temperature of the user. In other instances, the WRTS is a probe that can be inserted within a cavity to enable the measurement of a core body temperature of the user. For example, the WRTS can be earphones that include a temperature sensor that is in contact with a user's ear canal to allow for temporal measurement of the user's core body temperature, as measured within the user's ear canal.

The WRTS can also have different form factors based on the location of the user's body from which the user temperature is measured. For example, the WRTS can be smart glasses that measures a user's outside body temperature behind the user's ears, a smart watch or bracelet that measures a user's outside body temperature near the user's wrists, necklace pendants that measure a user's outside body temperature near the user's neck, or earphones that measure the user's core body temperature inside the user's ear canal.

The WRTS can be configured to measure user temperature of a user 102 over different time intervals and/or different frequencies. In some instances, the WRTS measures user temperature in real-time and transmits the measured user temperature to the control unit 110, the thermostat 130 and/or the server 150 to allow dynamic real-time set point temperature by the thermostat 130. For example, changes in user temperature resulting from changes in user activity can be used to inform the thermostat 130 to adjust the set point temperature to improve user comfort within the property 101. In other instances, the WRTS measures user temperature periodically at specified time intervals, e.g., every thirty minutes, to conserve computational and power resources associated with performing temperature measurement. In such instances, the measured user temperature is periodically transmitted to the control unit 110, the thermostat 130, and/or the server 150 to periodically adjust the set point temperature by the thermostat 130.

In some instances, the WRTS can be an activity tracker that performs other operations unrelated to temperature measurement. For example, the WRTS can be an activity tracker that monitors user activity data such as biometric data, fitness data, sleep data, user input data, or any other type of quantitative data. In such implementations, the WRTS can include different types of embedded sensors to measure various types of biometric data such as heart rate or rhythm, breathing rate, blood oxygen level, blood pressure, skin temperature, skin moisture, etc. The WRTS can also include hardware components such as an accelerometer, a gyroscope, a microphone, a camera, image sensors, video sensors, sound sensors, and/or an automated speech recognizer.

In some instances, the WRTS can function independently of the components of the property 101. For example, when a user wearing the WRTS is located outside of the property 101, the WRTS may be capable of operating independently of the control unit 110 and/or the thermostat 130 to measure and/or monitor a user temperature of the user. The monitored user temperature can be transmitted to the server 150 using a different network connection than the network 105, e.g., a cellular-based network that enables the WRTS to access the Internet.

In some instances, the WRTS is capable of determining the user temperature based on inferences made from biometric data collected from the user. In such implementations, the WRTS uses the user temperature determined using such inferences additionally, or alternatively, to the user temperature measured using one or more of the temperature sensing techniques as discussed above. The WRTS, in such implementations, can be an electronic device that does not include a temperature sensor, but is capable of determining the user temperature applying regression-based techniques that use a known correlation between a particular measured biometric parameter and a user's body temperature to predict the user temperature. For example, the WRTS can use sequential heart rate measurements to estimate a core body temperature of the user. In this example, any activity-based sensor, e.g., a fitness tracking device, can be used as the WRTS as discussed throughout this document. The WRTS, in such implementations, can function even without being attached to or worn by the user because another device that is nearby the user 102, such as a user device, may collect biometric measurements and then transmit the measurements to the WRTS.

Another example of a body metric that can be used to measure the user temperature is a measured perspiration level for the user. For example, the WRTS can measure the current perspiration level and/or the rate at which the perspiration level is changing to determine the energy used by the user's body in cooling the user and/or how much of that work could be potentially alleviated if the ambient air temperature was reduced. In some instances, the current perspiration level can also be detected using visual analysis of data collected by a camera, e.g., the IR camera 120 or another camera located in a property. Such data can be used to determine the appropriate level of temperature adjustment as discussed above. For example, if the user reports that he/she is feeling hot but not sweating, the set point temperature adjustment may not be as aggressive as if the user reported to be hot and sweating. In some instances, the WRTS can be capable of detecting the source of perspiration, e.g., sweaty palms, dry face, to treat temperature adjustment differently based on the source of perspiration, which are used as indicators of a user's comfort level.

In some implementations, the system 100 solicits feedback from a user located in the property 101 at different time points of the temperature regulation operations discussed above to improve the quality of temperature adjustment and/or customize the adjustment in different circumstances according to a user's preferences. For example, once the system 100 has performed an automated set point temperature adjustment, the system 100 may provide a short survey to a device of the user to determine the user's reported comfort level. In this example, positive responses submitted by the user in response to a set point adjustment can be used to determine whether the level of adjustment was appropriate based on the measured user temperature. As another example, the system 100 may periodically ask the user to indicate his/her preferences to identify changes to user preferences in relation to other environmental factors such as personal body temperature, metabolism, perspiration, time-of-day, seasonal changes, or different weather conditions. In this regard, feedback provided by the user can be used to generate user profile data that is then stored within user data. In some instances, the user feedback is used to create new set point temperature adjustment rules within the rule repository and/or modify existing set point temperature adjustment rules to be consistent with the feedback received from the user.

In some other implementations, the system 100 is capable of using passive monitoring techniques to improve temperature regulation operations without explicitly soliciting feedback from a user. For example, the system 100 can passively determine user preferences and/or activity patterns based on manual set point temperature adjustments made by the user over a specified monitoring period (e.g., one month). As another example, the system 100 can identify actions performed by the user in response to an automated set point temperature adjustment and determine a user's preference based on the identified actions (e.g., a user re-adjusting a set point temperature after an automated set point temperature adjustment reflects an aversion to the automated set point temperature adjustment). In some other examples, the system 100 can collect user input provided by the user in response to automated adjustments (e.g., set point temperature adjustment) without explicitly requesting the user to provide the user input. For instance, in response to automatically reducing the set point temperature of a thermostat, the user can provide feedback indicating that the current ambient temperature is too cold without the system 100 having to request the user to provide such feedback.

In some instances, the system 100 can passively determine the user's preference for a comfort environment by identifying time periods in which manual set point temperature adjustments occur least frequently, and the set point temperature settings during the identified time periods. For example, if a user makes no manual set point temperature adjustments in a three-day time period in which the ambient temperature is detected to be between 70 F and 73 F, then the system 100 passively identifies this temperature range as representing the user's preference for a comfortable environment. In some instances, this determination can be based on user information collected during the three-day time period. The user information can include personal body temperature, metabolism, physical exertion level, among others. For example, if the system detects that user has very little exertion during the three-day period, then the user's preference for the comfortable environment may be determined for time periods in which the user has not exerted himself physically. The system may also determine a different user preference for comfortable environments during time periods that the user exercises.

In various implementations, the system 100 is capable of using different types of modeling techniques to enable temperature regulation in the manner discussed throughout this specification. For example, in some implementations, the system 100 is configured to apply a homogenous temperature model in which users specify a single target temperature. In such implementations, the system 100 gathers temperature readings from the IR camera 120, and incorporates surface temperature of all visible surfaces. Based on this accumulated data, the system 100 can then determine an ambient temperature that is more representative of the environment within a property relative to that which is computed based solely on air temperature (as is the case for many thermostats). In such implementations, the system 100 can then adjust the HVAC system 140 to make up the difference compared to the preset target temperature (e.g., a set point temperature).

In some implementations, the system 100 is capable of using monitored surface temperatures to produce a fine-grained map that identifies objects within each region of the property 101 that require more heating/cooling than others. For example, the system 100 can use more zoned heating and/or cooling techniques to adjust the surface temperatures of individual objects accordingly based on their measured surface temperatures. Individual registers could also potentially be adjusted to focus airflow in specific directions to heat or cool specific parts of a room more effectively. In some instances, the system 100 can control individual registers, radiators, or sections of radiant floor heating to affect local changes in temperature to objects located within a region (or locations within the region where the objects are located). The system 100 can also use pattern recognition techniques to identify how windows, shades, and ventilation affect air temperature during different times of year, weather, and day. The identified patterns can then be used to manipulate the configuration of windows, shades, or ventilation to passively change the temperature. For example, a window can be opened to introduce cool air into a property without necessarily adjusting the operation of the HVAC system 140.

Figure 2:
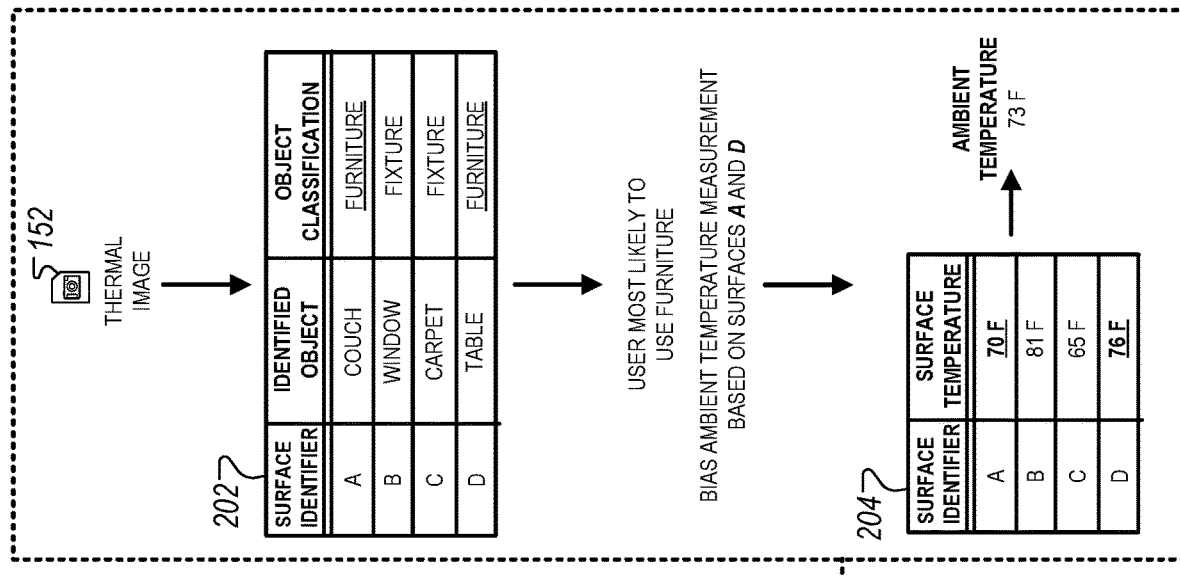
FIG. 2 illustrates an example of a technique for measuring ambient temperature based on classifying objects within a thermal image.
Figure 2:
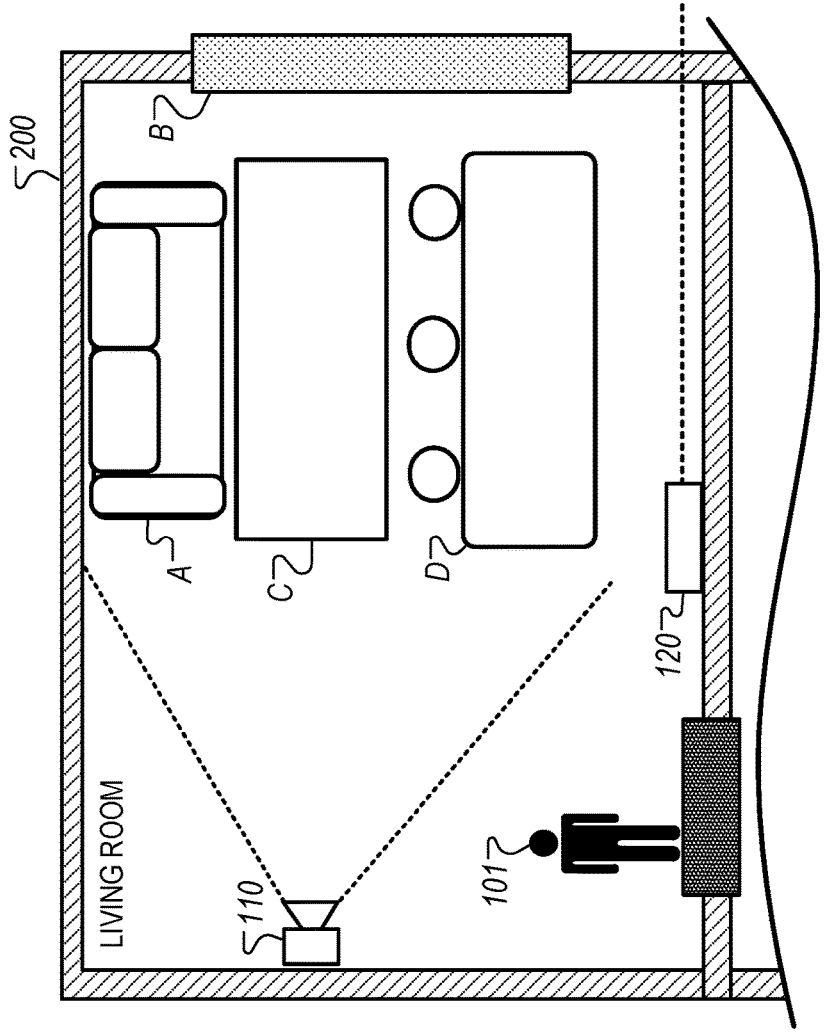
Figure 3:
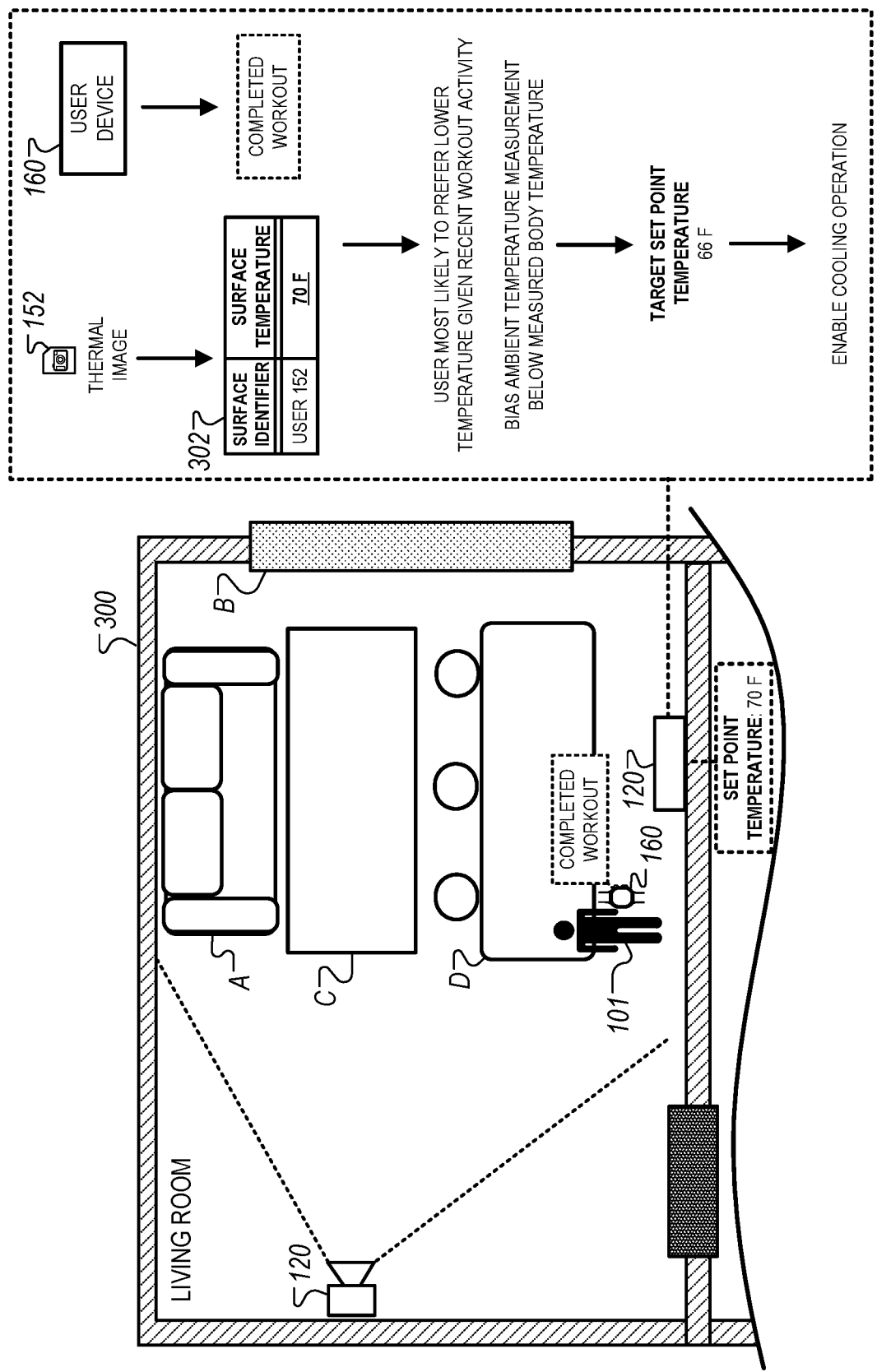
FIG. 3 illustrates an example of a technique for adjusting a set point temperature based on thermal data collected for a user.

In some implementations, the system 100 is configured to apply a furniture-focused temperature model (as shown in FIGS. 2 and 3). For example, if air temperature in the property 101 is 72 degrees Fahrenheit, but a user's favorite recliner happens to be near a window, and the sunlight may make the recliner's surface temperature a less-comfortable 85 degrees Fahrenheit. In this example, a user can specify that a particular piece of furniture should be kept at a specific temperature, and the system 100 could use the surface temperature monitoring techniques discussed throughout to maintain the user's specified surface temperature. For instance, the IR camera 120 located in the room of the furniture can detect the surface temperature of the furniture, and the system 100 can adjust heating and cooling accordingly to ensure that the furniture remains at a temperature that is identified as being more comfortable for the user. In some instances, the system 100 can also adjust individual registers to focus heated/cooled air onto a targeted object, as discussed throughout.

In some instances, the system 100 can be configured to apply traditional scheduling rules to furniture, or alternatively, location-specific surface temperature settings. For example, a user could specify that a recliner's surface temperature should be 70 degrees between 4-5 pm every day and a couch's surface temperature should be 75 degrees between 8-9 every day. The system 100 can then use the techniques disclosed herein to maintain the specified temperatures at the specified time periods. In other instances, the system 100 can be configured to learn usage patterns passively without requiring the user to specify scheduling rules. For example, the system 100 can monitor sensor data collected by the sensors 170 and observe that the recliner is used at around 4-5 pm every day, and automatically apply the desired target temperature to that specific surface at that time.

Figure 4A:
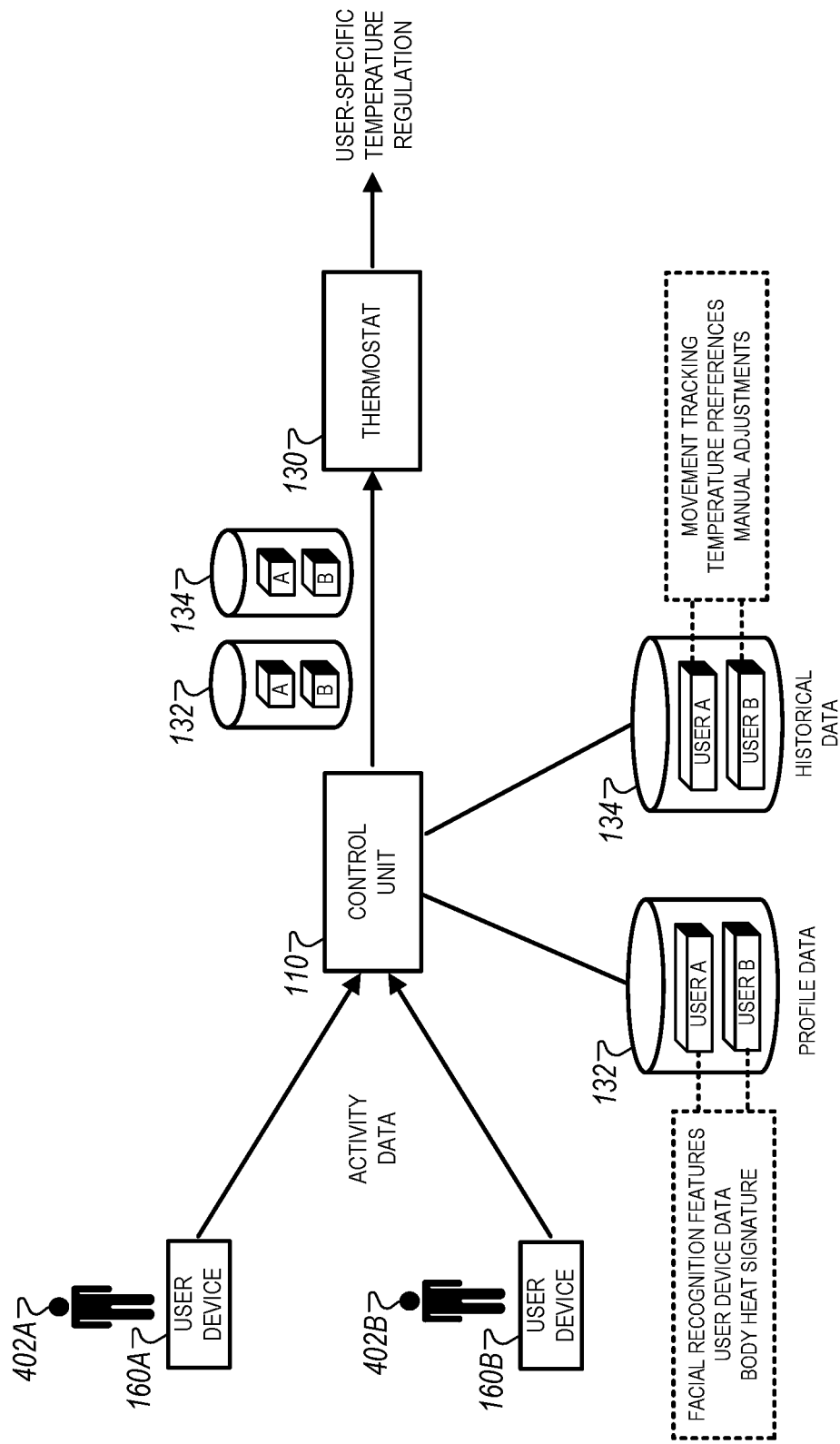
FIGS. 4A-C illustrates examples of techniques for adjusting set point temperatures based on thermal data collected for multiple users.

In some implementations, the system 100 is configured to apply a furniture-focused temperature model (as shown in FIG. 4A). For example, the IR camera 120 can monitor body temperature and constantly adjust the target temperature accordingly. For example, after a workout, a user may have an elevated body temperature and would feel more comfortable with the house at a slightly lower temperature as their metabolism returns to normal, a slightly higher temperature may (subjectively) feel more comfortable. By constantly monitoring the user's body temperature, the system 100 can keep adjusting the heating and cooling as needed, without the need for any active input from the user.

In some instances, the system 100 could base temperature adjustments directly on body temperature readings. For example, a one-degree increase in body temperature over normal could equate to a one-degree decrease from the original preset target in target home temperature. In other examples, other mapping values can be used to correlate body temperature and target home temperature. Alternatively, in other instances, the system 100 could learn from user input how to interpret body temperature changes. For example, the user could indicate whether they are too hot or too cold (e.g., via panel input, smartphone input, or voice-assistant input), and the system 100 could make small adjustments until the user indicates that he/she is comfortable. The system 100 could also learn over time to recognize that certain body temperature readings that equate to certain desired target temperatures, and the system 100 could adjust automatically without requiring user input.

In some instances, thermostat adjustments based on body temperature readings (e.g., based on data collected by the IR camera 120) can be based on a single core body temperature value, or based on an overall body-heat map generated based on core body temperature values measured for multiple users. Some users may be more sensitive to the temperature of their extremities, while others may be more focused on torso temperature, while in other cases a more nuanced combination may be required in order to learn the appropriate model. Additionally, the system 100 can also learn how much time at a given target temperature is needed before the ambient temperature changes, and how much time at a given ambient temperature is needed before the user's body temperature changes. With this data, the system 100 can adjust timing to stay ahead of user requests.

As discussed throughout, the system 100 can also track user movement and predict when a user is going to need a different vent opened or closed. For example, if the system 100 recognizes that the user is moving from the west-end of a room to the east-end of the room, it can begin opening a vent located on the east side of the room before the user approaches the east-end of the room.

In some implementations, the system 100 can be configured to provide various types of energy savings. For example, the system 100 can be configured to learn the true comfort ranges of users and then initiate heating and cooling to precisely target those ranges in specific areas on a just-in-time basis. In this way, the system can substantially reduce the amount of energy used when a user sets the thermostat manually, brings the whole house to a new temperature, then adjusts back the other direction. In some instances, the system 100 can monitor the temperature in real time (e.g., temperatures of air vents, radiators, radiant floor heating, etc.) and assess losses in the system. This data may help identify areas to improve efficiency, or detect problems as soon as they occur.

In some implementations, the system 100 can be deployed to vehicles in a similar manner as discussed throughout for a property. For example, a vehicle may be equipped with the IR camera 120 that also functions as a safety feature to monitor attention. The IR camera 120 in the vehicle can then collect thermal images to enable the identification of surface temperatures in a similar manner as discussed throughout. For example, a vehicle thermostat could detect body-temperature variations of users and adjust the air temperature of the vehicle accordingly. As another example, target body temperature can be dropped if a driver was determined to be less alert or falling asleep.

Figure 1B:
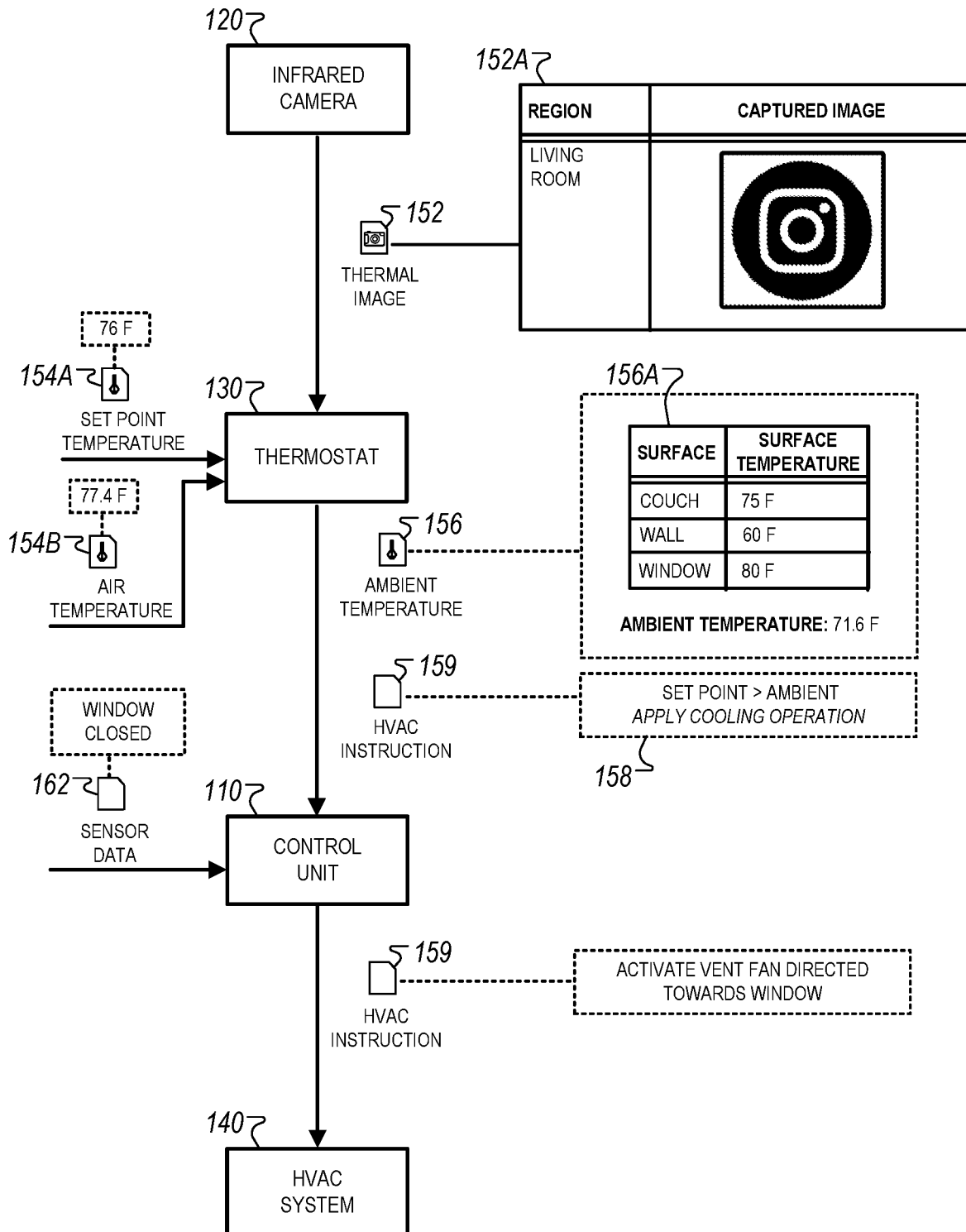
FIG. 1B illustrates an example of a process for configuring temperature regulation based on an ambient temperature determined using thermal imaging.

FIG. 1B illustrates an example of a process for configuring temperature regulation based on an ambient temperature determined using thermal imaging. In this example, the system 100 determines an ambient temperature based on surface temperatures of multiple objects within a region, comparing the ambient temperature to a set point temperature monitored by the thermostat 130, and generating an instruction to configure operation of the HVAC system 140. In this way, the system 100 is capable of performing a more directed temperature regulation operation based on processing surface temperature data in addition to air temperature measurement by a thermostat.

As shown in FIG. 1B, the thermostat 130 receives a thermal image 152 collected by the IR camera 120. The thermal image 152 identifies a region that is imaged by the IR camera 120 and objects within the image. For example, as shown in table 152A, the thermal image 152 identifies a living room of a property and a captured image of objects within the living room. The objects can be identified using a suitable object identification and/or recognition technique. For example, visual attributes of objects within the thermal image 152 can be used to automatically identify or label the objects that are present within the thermal image 152.

The thermostat 130 determines an ambient temperature 156 based on processing the thermal image 152. As described throughout, the ambient temperature 156 can be measured based on one or more surface temperatures of object surfaces identified in the thermal image 152. As shown in table 156A, in the example shown in FIG. 1B, the ambient temperature 156 is determined based on combining three surface temperature measurements for three surfaces (e.g., couch, wall, surface). For example, the surface temperatures of 75 degrees Fahrenheit, 60 degrees Fahrenheit, and 80 degrees Fahrenheit are combined to determine an ambient temperature measurement of 71.6 degrees Fahrenheit.

The ambient temperature 156 can be determined using various techniques in implementations other than that which is shown in FIG. 1B. For example, in some implementations, the ambient temperature 156 is based on a surface temperature that is most likely to contribute to a user's perceived temperature (which then impacts his/her preferred comfort level). For example, if the system 100 determines (based on activity data and/or activity data of a user) a couch that the user frequently sits on for extended periods of time, then a surface temperature of the couch is used to determine the ambient temperature 156. In some instances, the surface temperature of the couch is used to adjust a baseline air temperature measured by the thermostat 130. For example, if the surface temperature of the couch is higher than the measured air temperature, then the value of the ambient temperature can be increased to more accurately reflect a user's perceived temperature. In other instances, the surface temperature of the couch itself is used as the ambient temperature in lieu of the air temperature measured by the thermostat 130.

The thermostat 130 evaluates a monitoring rule 158 based on the ambient temperature 156, the set point temperature 154A, and the air temperature 154B. The monitoring rule 158 specifies a comparison between the ambient temperature

156 and the set point temperature 154A to determine an HVAC instruction 159 based on the comparison. As shown, the monitoring rule 158 specifies a condition that if a value of the set point temperature 154A exceeds a value of the ambient temperature 156, then the HVAC instruction 159 should be to apply a cooling operation to reduce the air temperature 154B within the living room. For example, in applying the monitoring rule 158, the thermostat 130 determines that the 76 degree Fahrenheit value of the set point temperature 154A exceeds the 71.6 degree Fahrenheit value of the ambient temperature 156, and in response, the thermostat 130 determines that the monitoring rule 158 is satisfied.

An HVAC instruction 159 is generated based on the monitoring rule 158 and provided to the HVAC system 140. As discussed above, the HVAC instruction 159 specifies the initiation of a cooling operation based on the determination that the value of the ambient temperature 156 is less than the value of the set point temperature 154A. The control unit 110 provides the HVAC instruction 159 to the HVAC system 140 to initiate the cooling operation.

In some instances, the HVAC instruction 159 can be modified beyond the monitoring rule 158 based upon sensor data 162 monitored by the control unit 110. In the example shown in FIG. 1B, the control unit 110 obtains sensor data indicating that a window is closed. In this example, the control unit 110 determines that the present configuration of the window (e.g., closed) may a contributing factor to the value of the air temperature 154B and the value of the ambient temperature 156 being greater than the set point temperature 154A. The control unit 110 thereby modifies the HVAC instruction 159 to further specify that the HVAC system 140 activate a vent fan that is directed towards the window. In this example, the HVAC instruction 159 is based on both the surface temperature of the window being high (as shown in table 156A), the present configuration for the window as indicated by the sensor data 162, and the measured air temperature 154B. In this way, the control unit 110 can process various types of data (e.g., sensor data, thermal data, temperature data, etc.) to determine the most effective operation to address the present environmental conditions of the property.

FIG. 2 illustrates an example of a technique for measuring ambient temperature based on classifying objects within a thermal image. In this example, the system 100 biases the determination of ambient temperature based on classifications for objects identified in a thermal image. In this way, ambient temperature measurement is biased towards objects that are more likely to be interacted with the user (e.g., furniture) rather than other objects that are not likely to effect temperature perceived by the user (e.g., doors, windows).

In the example shown in FIG. 2, a living room of a property 200 includes four objects that are within the field of view of the IR camera 120 (e.g., objects identified as "A," "B," "C," and "D"). As shown in table 202, object A corresponds to a couch, object B corresponds to a window, object C corresponds to a carpet, and object D corresponds to a table. The four objects are classified based on the type of object represented in the thermal image 152 using, for instance, machine learning or object recognition techniques. For example, the control unit 110 can identify and process visual attributes within the thermal image 152 to determine an object classification for each of the objects A-D.

The object classifications can be used to identify objects that are predicted to be most likely to be interacted with by the user. For example, objects A and D are classified as furniture that the user would directly interact with, whereas objects B and C are fixtures that are in the living room but not objects with which the user would directly interact. In this way, objects that are more likely to contribute to a user's perceived comfort level (based on a perceived temperature within the living room) are applied a greater weight in determining the ambient temperature that is measured for the living room.

Surface temperatures are determined for each of the objects A-D and used by the control unit 110 (or, in some instances, the thermostat 130) to determine the ambient temperature. As shown in table 204, the ambient temperature measurement is biased towards the surface temperatures of objects A and D given their classifications as furniture that are most likely come into direct contact with the user. For example, the surface temperature of the couch can contribute to the perceived temperature by the user since he/she sits on it. As another example, the surface temperature of the table may similarly contribute to the perceived temperature since the user may place his/her arms on top of the table. In comparison, the carpet and/or the window are less likely to come into contact with the user. Based on these determinations, the control unit 110, in this example, determines ambient temperature based on combining only the surface temperatures determined for objects A and D. For example, as shown in FIG. 2, the ambient temperature measurement of 73 degrees Fahrenheit is determined based on determining an average of the surface temperature of 70 degrees Fahrenheit for object A and the surface temperature of 76 degrees Fahrenheit for object D.

FIG. 3 illustrates an example of a technique for adjusting a set point temperature based on thermal data collected for a user. In this example, the system 100 uses activity data collected by the user device 160 to dynamically adjust set point temperature according to a predicted user comfort level. In this way, the technique used to determine ambient temperature can be adjusted based on a user's present activity level to more accurately reflect a user's perceived temperature level.

In the example shown in FIG. 3, a living room of a property 300 is monitored by the IR camera 120 in association with activity data of the user collected by the user device 160. For instance, the user device 160 can be a wearable device (e.g., a smartwatch) that tracks exercise activity recently performed by the user. The thermal image 152 collected by the IR camera 120 identifies the user as an imaged object and the body temperature of the user is used as a surface temperature, as shown in table 302.

The surface temperature in table 302 is contextualized based on activity data collected by the user device 160 to determine ambient temperature and/or perform an operation responsive to determining the ambient temperature. For example, though the surface temperature of the user identified in table 302 matches the set point temperature (e.g., 70 degrees Fahrenheit), the activity data from the user device 160 indicating that the user recently completed a workout is used to determine that a user's body temperature is higher than usual (e.g., a baseline body temperature of the user while resting or not exercising).

Given the recent workout activity of the user, the control unit 110 determines that the set point temperature may not properly reflect the user's preference for a comfortable environment. For example, the user may prefer an air temperature lower than that specified by the set point temperature given that his/her body temperature is much higher than usual based on recent physical activity. The control unit 110 thereby lowers the target set point temperature to 66 degrees Fahrenheit. Further, because the new set point temperature is less than the ambient temperature, the control unit 110 also instructs the HVAC system 140 to initiate a cooling operation to lower the air temperature within the living room.

Figure 4B:
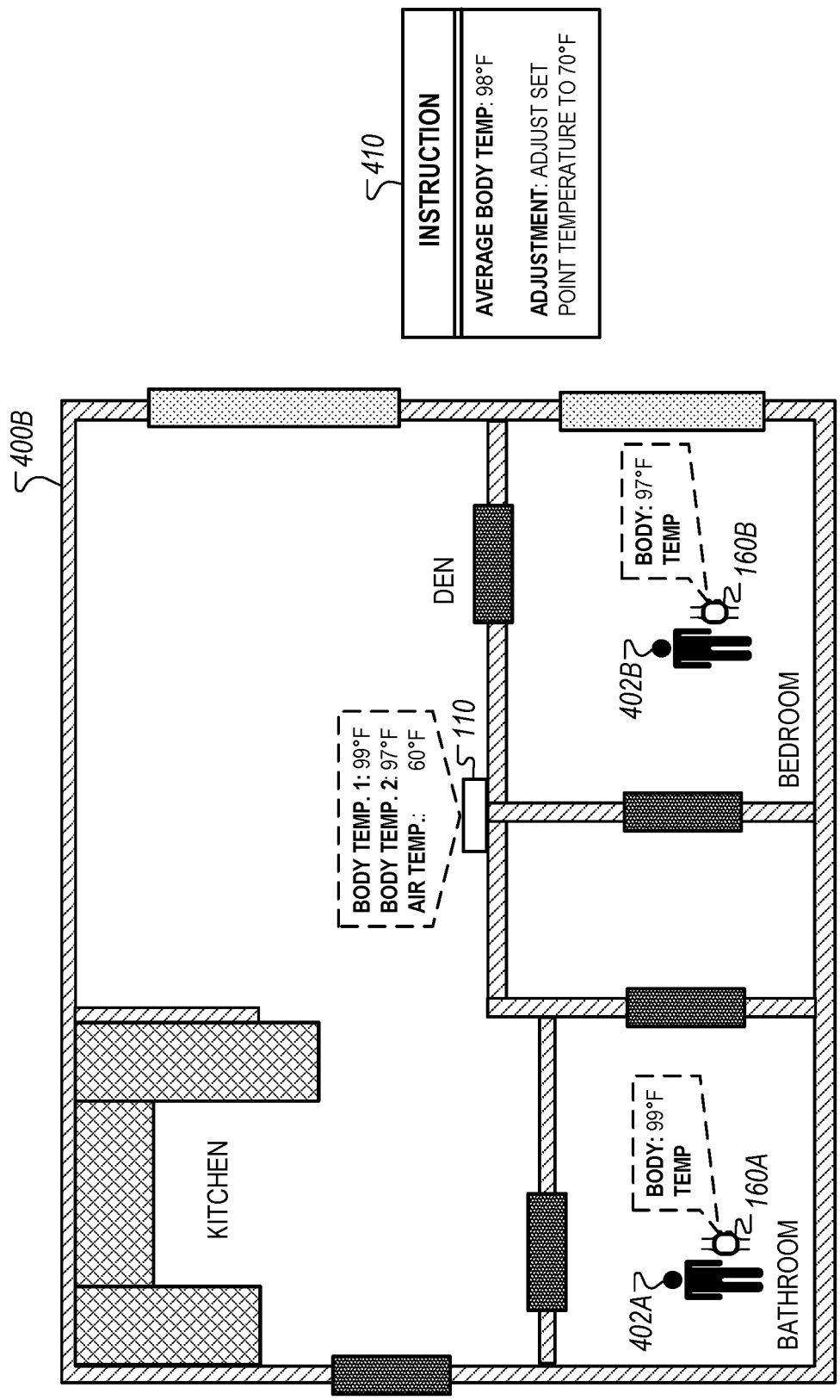
Figure 4C:
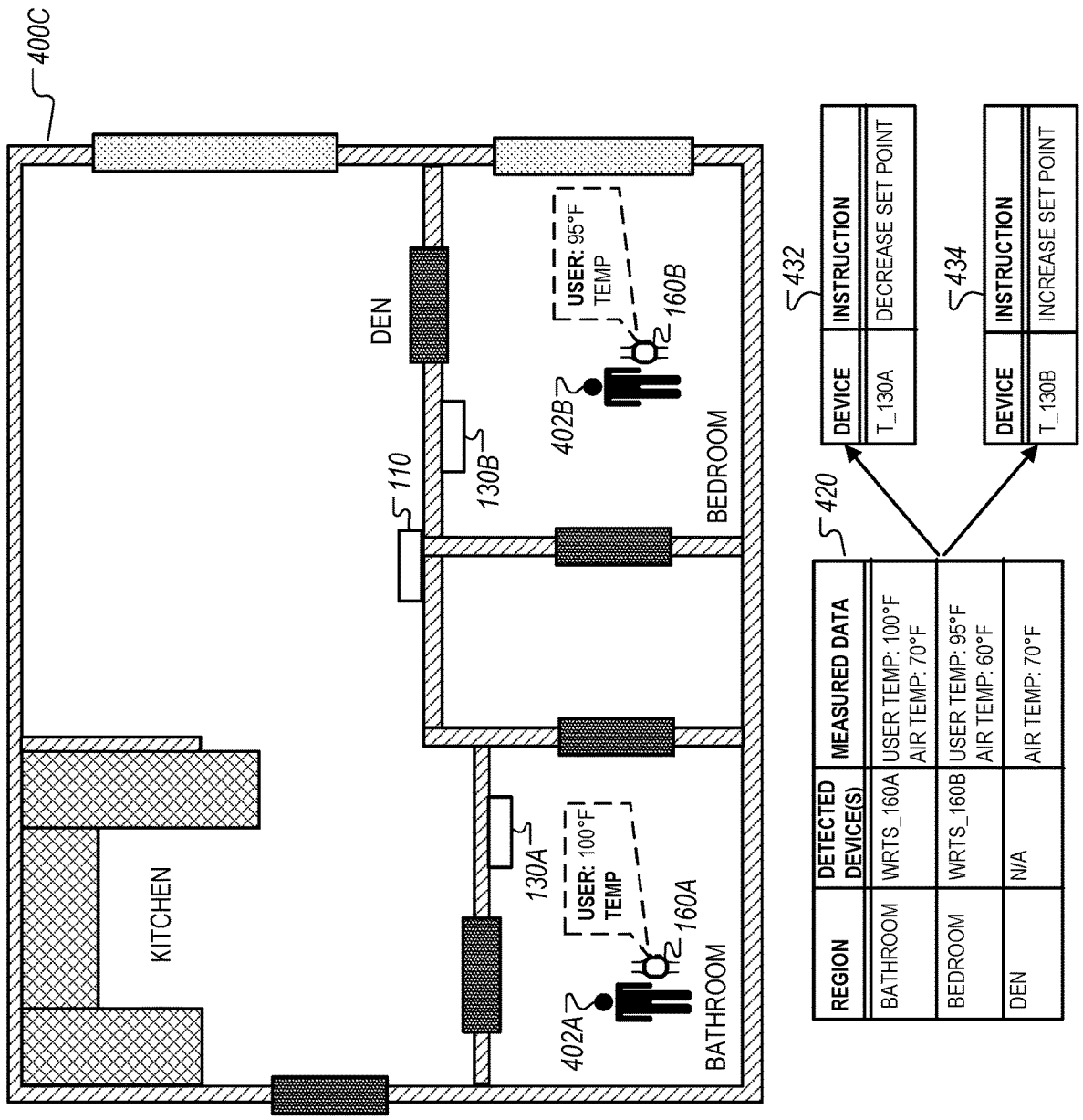

FIGS. 4A-C illustrates examples of techniques for adjusting set point temperatures based on thermal data collected for multiple users. Referring initially to FIG. 4A, an example of a set point temperature adjustment technique based on user data collected for multiple users 402A and 402B is depicted. In the example shown in FIG. 4A, the control unit 110 monitors activity data of multiple users 402A and 402B in conjunction with profile data 132 and historical data 134 to determine the most effective approach for performing temperature regulation operations (e.g., determining an ambient temperature, adjusting a set point temperature, initiating or terminating a heating/cooling operation, etc.).

As shown in FIG. 4A, various types of user data can be employed to perform may be used to perform temperature regulation. For instance, activity data can represent movement of a user throughout the property, actions performed by the user (e.g., exercise activity, watching television, sleep, etc.), time points when the user occupies the property, among others. Profile data 132 can represent data used to uniquely identify and/track a user, such as facial recognition features, user device data, body heat signature, among others.

The profile data 132 can be used by the control unit 110 to map sensor data collected by the sensors 170 to users that performed actions associated with the sensor data. For example, if a security camera captures video footage of a person entering the property, facial recognition information included in the profile data 132 can be used to identify the identity of the person as one of the users 402A and 402B that are known to be associated with a property. This event can then be used to update historical data 134 to reflect that the person has entered the property and is presently occupying the property.

The historical data 134 can include logged events, milestones, or other information that has been captured by the system 100 over a certain time period (e.g., day, week, month, year, etc.). As examples, the historical data can include tracked movement logs representing movement by a user within the property, temperature preferences of the user as specified by user input or previous adjustments to set point temperature, among others. In some instances, the system 100 may be capable of using pattern recognition techniques to identify user-specific trends within the historical data 134. For example, historical movement tracking can be used to identify paths that a user frequently takes within the property, regions that are most frequently occupied by the user, or objects within a room that have the highest likelihood of being used by the user. As another example, historical temperature adjustment data can be used to determine an ideal set point temperature for a user, or combine activity data with temperature adjustments to determine context-specific preferences of the user. For instance, historical temperature adjustments made by a user after he/she is identified to have performed exercise activity can be used to determine the user's temperature preferences after exercise activity (which is then distinguished form the user's temperature preferences when resting or not performing exercise activity). Context-specific patterns can be identified by combining pattern recognition of activity data (e.g., user performing a specific action) and pattern recognition of actions representing preferences for temperature adjustments (e.g., user changing a temperature setting of the thermostat 130 before, during, or after performing the specific action).

Temperature preferences (e.g., temperature for a comfortable environment) of the users 402A and 402B can be managed differently in distinct circumstances. In some implementations, the control unit 110 employs a prioritization scheme to perform temperature regulation according to the activity data of a specific user. For example, if the user 402A is prioritized over the user 402B, then activity data collected by the user device 160 and profile data 132 and historical data 134 corresponding to the user 402A is solely used to perform temperature regulation operations. In such implementations, temperature regulation is performed primarily based on the preferences of the user 402A. In scenarios where preferences of the users 402A and 150B conflict, the system 100 may opt to perform temperature regulation by prioritizing the preferences of the user 402A only.

In some instances, preferences for a certain user can be prioritized in specific regions (e.g., prioritizing preferences of user 402A in the living room, but prioritizing the preferences of user 402B in the kitchen), or alternatively in certain contexts (e.g., prioritizing preferences of user 402A during night time, but prioritizing the preferences of user 402B during day time). In this way, the prioritization scheme can be dynamically adjusted based on various factors, such as the type of temperature regulation to be performed (e.g., set point temperature adjustment vs. terminating a heating/cooling operation), the location within a property where temperature regulation is performed, or the present conditions of the property when temperature regulation is performed.

In other implementations, the control unit 110 employs a collective processing scheme to perform temperature regulation by combining priorities of multiple users. For example, if the user 402A has a preference for a hotter environment in the living room and user 402B has a preference for a cooler environment in the living room, then the control unit 110 can identify a middle-ground temperature that reflects the preferences of both users 402A and 150B. For instance, the control unit 110 can determine an average of the preferred temperatures of both users 402A and 402B and configure the set point temperature to match the average. In other examples, the system can be configured to permit multi-region temperature control within the same room. For instance, if the user 402A is at one side of a living room, and user 402B is at another other side of the living room, the control unit 110 can raise the temperature on the side of the living room in which the user 402A is located, and lower the temperature on the other side of the living room in which the user 402B is located. In this example, the control unit 110 may have the capability to control, for instance, multiple HVAC vents located on each side of the living room so that one vent is configured to release more hot air than the other vent to distinctly adjust the temperatures in the multiple regions of the same room.

Referring now to FIG. 4B, an example of a set point temperature adjustment technique based on body temperatures for multiple users is depicted. In this example, the control unit 110 monitors body temperatures of users 402A and 402B based on data collected by WRTS 160A and 160B, respectively (e.g., user 402A is identified has having a body temperature of 99 degrees Fahrenheit, and user 402B is identified has having a body temperature of 97 degrees Fahrenheit). The control unit 110 also uses location tracking to determine that users 402A and 402B are located in different regions of property 400B (e.g., user 402A is located in the bathroom of property 400B and user 402B is located in the bedroom of property 400B).

As shown in FIG. 4B, the control unit 110 monitors body temperature and location and generates an instruction 410 used for temperature regulation within the property 400B. In this example, the property 400B has a single thermostat that monitors the air temperature of the entire property 400B (i.e., the property 400B is configured with an HVAC system with a single region for which temperature monitoring and adjustment is performed). The control unit 110 thereby uses the measured body temperatures of the users 402A and 402B to determine an average body temperature (e.g., 98 degrees Fahrenheit) that is then used for temperature adjustment. The control unit 110 determines that current air temperature is 60 degrees Fahrenheit and adjusts the set point temperature to 70 degrees Fahrenheit based on the average body temperature.

Referring now to FIG. 4C, an example of a multi-region set point temperature adjustment technique is depicted. In this example, the control unit 110 similarly monitors body temperatures of users 402A and 402B based on data collected by WRTS 160A and 160B, respectively (e.g., user 402A is identified has having a body temperature of 100 degrees Fahrenheit, and user 402B is identified has having a body temperature of 95 degrees Fahrenheit). The control unit 110 also uses location tracking to determine that users 402A and 402B are located in different regions of property 400C (e.g., user 402A is located in the bathroom of property 400C and user 402B is located in the bedroom of property 400C).

In the example shown in FIG. 4C, the property 400C has multiple thermostats 130A and 130B that monitor the air temperatures of a corresponding region of the property 400C (i.e., the property 400B is configured with an HVAC system with multiple regions for which temperature monitoring and adjustment is respectively performed). For example, thermostat 130A is configured to monitor the air temperature of the bathroom of the property 400C whereas thermostat 130B is configured to monitor the air temperature of the bedroom of the property 400C.

As shown in table 420, the control unit 110 monitors body temperature of a user located in corresponding location of the property 400C and generates respective instructions based on the measured body temperature of each user. For example, the control unit 110 generates an instruction 432 for the thermostat 130A and an instruction 434 for the thermostat 130B. In this example, different thermostat instructions are generated since a different type of set point temperature adjustment is determined based on the respective body temperatures of the user that is located in each region. For instance, the body temperature measured for user 402A is higher than baseline, which is used to predict that the user is feeling hot. The instruction 432 thereby specifies decreasing the set point temperature monitored by thermostat 130A. In contrast, the body temperature measured for user 402B is lower than baseline, which is used to predict that the user is feeling cold). As a result, the instruction 434 specifies increasing the set point temperature monitored by thermostat 130B. In this way, temperature regulation performed by the control unit 110 enables region-specific temperature adjustment that is customized based on the monitored body temperature for a user located in each region.

Instruction 410 can be used for temperature regulation within the property 400B. In this example, the property 400B has a single thermostat that monitors the air temperature of the entire property 400B (i.e., the property 400B is configured with an HVAC system with a single region for which temperature monitoring and adjustment is performed). The control unit 110 thereby uses the measured body temperatures of the users 402A and 402B to determine an average body temperature (e.g., 98 degrees Fahrenheit) that is then used for temperature adjustment. The control unit 110 determines that current air temperature is 60 degrees Fahrenheit and adjusts the set point temperature to 70 degrees Fahrenheit based on the average body temperature.

Figure 5:
FIG. 5 illustrates an example of a process for using thermal imaging to configure temperature regulation operations of a monitoring system.
Figure 5:
Figure 5:

FIG. 5 illustrates an example of a process 500 for using thermal imaging to configure temperature regulation operations of a monitoring system. Briefly, the process 500 includes the operations of obtaining a thermal image of a surface associated with a region of a property (510), determining a surface temperature of the surface (520), determining an ambient temperature for the region (530), and performing an operation (540).

In general, the process 500 is described below in reference to system 100 although other types of property monitoring systems can also be configured to perform the operations of the process 500. For example, as discussed throughout, a standalone monitoring device, such as a personal assistant device, can be configured to exchange data communications with an existing property monitoring system that collects sensor data, temperature data, or thermal images. This configuration could be used to enable the standalone device to determine ambient temperature and configure a thermal regulation operation associated with a property (e.g., adjusting a set point temperature monitored by a thermostat, initiating a heating/cooling operation, terminating an ongoing heating/cooling operation, opening windows/doors or vents of an HVAC system).

In some implementations, the operations of the process 500 are performed by multiple components of the system 100. For example, the IR camera 120 can collect a thermal image of a region of the property 101, the thermostat 130 can determine an ambient temperature for the region based on the thermal image, and the control unit 110 can determine the operation to be performed based on the ambient temperature. Alternatively, in other implementations, the operations of the process 800 are performed by a single component of the system 100, such as the control unit 110, the thermostat 130, or the server 150. For example, data collected locally at the property 101 can be transmitted to the server 150 over the network 105 for processing in a location that is remote from the property 101. In this example, data collected by the IR camera 120, the thermostat 130, the HVAC system 140 is minimally processed by the control unit 110 (e.g., processed for the purposes of aggregation and network transfer but not for the measurement of data parameters), and transmitted to the server 150, which measures data parameters (e.g., ambient temperature) and generates insights based on the measured data parameters (e.g., a determination as to whether a user is likely to find the environment in the property 101 uncomfortable).

In more detail, the process 500 can include the operation of obtaining a thermal image of a surface associated with a region of a property (510). For example, the thermostat 130 can obtain the thermal image 152 collected by the IR camera 120. In the example shown in FIG. 1B, the thermal image 152 is of a surface within a region of the property 101 (e.g., a surface of a couch located in a living room). As discussed throughout, the thermal image 152 can represent visual displays of the amount of IR energy emitted, transmitted, and/or reflected by an object that is imaged.

The process 500 can include the operation of determining a surface temperature of the surface (520). For example, the thermostat 130 can determine a surface temperature of the surface that is imaged in the thermal image 142. As discussed throughout, the surface temperature can be determined based on determining emissivity attributable to thermal radiation of the surface and deriving a surface temperature based on the emissivity. In the example shown in FIG. 1B, the thermostat 130 identifies surface temperatures of three objects that are imaged in the thermal image 152—a couch, a wall, and a window of the living room of a property. In this example, the surface temperature of the couch, the wall, and the window are determined to be 75 degrees Fahrenheit, 60 degrees Fahrenheit, and 80 degrees Fahrenheit, respectively.

The process 500 can include the operation of determining an ambient temperature for the region (530). For example, the thermostat 130 can determine the ambient temperature 156 based on the surface temperature determined in step 520. As discussed throughout, various techniques can be employed in determining the ambient temperature. In some implementations, the ambient temperature is determined based on augmenting a baseline air temperature measurement (e.g., a temperature measured by the thermostat 130) with the surface temperature(s) identified in the thermal image 152. For example, if air temperature measured in the vicinity of the thermostat 130 is lower than a surface temperature within the thermal image 152, then the ambient temperature can be increased relative to the air temperature to more accurately reflect a temperature perceived by the user.

In other implementations, the ambient temperature is determined primarily based on the surface temperature (e.g., the ambient temperature is determined based on a value of the surface temperature). For example, the ambient temperature measured for a bedroom with a single bed and no other furniture can be based on the surface temperature of the bed. In this example, the ambient temperature is inferred from the measured surface temperature of the bed since no other furniture is located inside the bedroom. The surface temperature can be adjusted and/or normalized to reflect an ambient temperature so not no air temperature measurement is need to compute ambient temperature. In this way, ambient temperature can be measured for regions of a property that do not have a thermostat. In some instances, the single surface temperature used for ambient temperature measurement can be based on anticipated usage by a user. For example, if the couch of a living room is predicted to have the greatest usage from among other furniture in the living room, then only the surface temperature of the couch is used to determine the ambient temperature of the living room.

In some other implementations, the ambient temperature is measured by combining multiple surface measurements. For example, as shown in FIG. 1B, the thermostat 130 determines a value of the ambient temperature 156 based on averaging the values of three surface temperature measurements (i.e., 75 degrees Fahrenheit, 60 degrees Fahrenheit, 80 degrees Fahrenheit).

The process 500 can include the operation of performing an operation (540). For example, the thermostat 130 or the control unit 110 can perform an operation related to temperature regulation based on the ambient temperature determined in step 530. In the example depicted in FIG. 1B, the operation involves transmitting the instruction 164 to the HVAC system 140 to activate a vent fan directed to a window to reduce the measured surface temperature (i.e., 80 degrees Fahrenheit) based on the ambient temperature being greater than the set point temperature. In this example, the operation is performed to reduce the likelihood of the user perceiving the room where the window is located as being uncomfortable. For instance, by activating the vent, the HVAC system 140 directs more air to the room, thereby reducing the air temperature. In other examples, the operation can include one or more of adjusting the set point temperature monitored by the thermostat 130, activating or terminating a heating/cooling operation by the HVAC system 140 (e.g., based on comparing the measured ambient temperature to the set point temperature), providing an alert or notification to the user device 160, among others discussed throughout.

The process 500 can include additional operations in various implementations. For example, in some implementations, the process 500 further includes identifying a set of objects location in a region that correspond to a set of surfaced identified in a thermal image of the property. For example, as shown in FIG. 1B, the thermostat 130 or the control unit 110 can identify three objects (e.g., couch, wall, window) that are associated with three surfaces identified in the thermal image 152 of the living room of a property.

The thermostat 130 or the control unit 110 may also determine an object classification for each object included in the set of objects. For example, in the example shown in FIG. 2, the table 202 identifies four objects (e.g., objects identified as "A," "B," "C," "D") and classifications for each of the four objects. In this example, the object classification is used to select a subset of surfaces for which surface temperatures are used to calculate an ambient temperature for a region including the four objects. As shown in FIG. 2, the system selects objects "A" and "D," which are classified as furniture, but does not select objects "B" and "C," which are classified as fixtures. This selection is based on objects "A" and "D" having a higher likelihood of user interactions, and, as a result, a higher likelihood of their respective surface temperatures. In the example shown in FIG. 2, the system determines that the ambient temperature is 73 F, which is the average surface temperature of the surface temperatures for objects "A" and "D."

In some implementations, the thermostat 130 or the control unit 110 can additionally, or alternatively, determine surfaces that are likely to be interacted with by a user based on evaluating historical activity data associated with each object. For example, the thermostat 130 or the control unit 110 can obtain historical activity data associated with a property. The historical activity data can identify a set of interactions of the user with each object included in the set of objects. The historical activity data can be generated based on images previously collected by the IR camera 120 or based on activity data collected by other sensors and/or devices located within the property 101. The set of interactions may specify different types of usage parameters, such as the number of times a user has interacted with a given object over a certain period of time (e.g., a number of times a user has sat on a couch during a particular day), the amount of time a user spends interacting with an object over a certain time period (e.g., the among of time the user spends sitting on a couch during a particular day), the types of interactions performed by a user (e.g., sitting on a couch, using a table), or the type of actions performed by the user while interacting with the couch (e.g., reading a book on a couch, sleeping on a couch, watching television on a couch, etc.). The thermostat 130 or the control unit 110 can then determine a respective number of interactions for each object included in the set of objects based on the historical activity data. For example, the thermostat 130 or the control unit 110 can select three of six objects that have the greatest number of interactions within a three-day period (which then reflect the objects that are most likely to have subsequent user interaction).

In some implementations, the process 500 includes using data obtained from a user device to adjust one or more temperature controls for a region of a property. For example, as shown in FIG. 4C, the system obtains data collected by WRTS 160A and 160B. The obtained data can identify a present condition of a user. As described throughout, the present condition can include information such as, a body temperature measured by a wearable device, health data collected by the wearable device (e.g., heart rate data, pedometer data, caloric consumption data, sleep monitoring data, etc.), an activity currently being performed and/or recently completed by a user (e.g., an exercise activity, device interaction data, cooking, reading, etc.), or other types of information that may be used to determine a user's temperature preference. For example, the system may determine that a user has a preference for a ambient temperature that is lower than the set point temperature of the thermostat if, for example, the activity data indicates that the user has recently completed an exercise activity. As another example, the system may determine that the user has a preference for a higher ambient temperature that is greater than the set point temperature of the thermostat if, for example, has recently entered the property and the outside temperature is significantly lower than the current ambient temperature inside the property.

In some instances, the thermostat 130 or the control unit 110 obtains data indicating a surface temperature of the user and an indication that the user exercised within a predetermined time period. For example, the surface temperature of the user can be higher than baseline since the user is identified to have exercised in the last hour. In this example, the surface temperature of the user can be equal to the set point temperature of the thermostat 110. The thermostat 130 or the control unit 110 can then determine a user preference for a lower ambient temperature based on the data indicating that the user exercised within the predetermined time period (e.g., in the last hour). The thermostat 130 or the control unit 110 can then adjust one or more temperature controls for the region by, for example, providing an instruction to the HVAC system 140 that, when received, causes the HVAC system 140 to initiate a cooling operation associated with a region where the user is presently located.

In some implementations, the thermostat 130 or the control unit 110 determines ambient temperature for a region based on a user temperature preference and activity data indicating a present condition for a user. In such implementations, the system can determine a baseline ambient temperature based on the surface temperature. For example, as shown in FIG. 1B, the thermostat 130 determines an ambient temperature based on surface temperatures included in table 156A. The thermostat 130 or the control unit 110 can also determine to lower the baseline ambient temperature based on the preference for the lower ambient temperature. For example, if the user has recently completed an exercise activity, the user likely has a preference for lower temperature, which the thermostat 130 or the control unit 110 uses to reduce the baseline ambient temperature computed from surface temperatures.

The system may adjust one or more temperature controls by providing instructions to an HVAC system that, when received by the HVAC system, cause the HVAC system to initiate different operations. For example, if the system determines that it may be beneficial to reduce the ambient temperature based on user data indicating that he/she has completed an exercise activity, then the system can provide an instruction to the HVAC system to initiate a cooling operation. As another example, if the system determines that it may be beneficial to increase the ambient temperature based on user data indicating that he/she has recently entered the house, then the system may provide an instruction to the HVAC system to initiate a heating operation. In other examples, the system may perform other types of temperature controls. For example, the system can adjust a current set point temperature of a thermostat, adjust vent configurations of one or more vents associated with an HVAC system, adjust air flow within the property by opening or closing windows and doors, or enabling or disabling devices other than the HVAC system that impact heating and cooling within a property (e.g., fans, heaters, etc.).

In some implementations, the process 500 involves determining the ambient temperature based on surface temperatures of two or more surfaces that are identified in a thermal image. In such implementations, the ambient temperature can be based on combining surface temperatures of all surface temperatures (as shown in FIG. 1B), or alternatively, combining surface temperatures of a subset of surface temperatures (e.g., only those surfaces that have a likelihood of user interaction, as shown in FIG. 2). The system may use different aggregation techniques to compute an aggregate surface temperature that is used to determine the ambient temperature. In the example shown in FIG. 1B, the system determines the aggregate surface temperature of the region based on computing an average of surface temperatures of three surfaces identified in the thermal image 152.

In some implementations, the system can assign weights to different surfaces to adjust the manner in which an aggregate surface temperature is computed based on surface temperatures for a set of surfaces identified in a thermal image. For instance, the system can assign a higher weight to a surface that is more likely to impact a user preference for user temperature compared to another surface that is less likely to impact the user preference. For example, if one surface is a couch that a user spends more of his/her time and the other surface is a bench that the user spends less of his/her time, then the system may assign a weight to the couch that is higher than a weight assigned to the bench. In this example, the relative values of the weights is used to bias the aggregate surface temperature to more closely reflect the surface temperature of the couch.

Additionally, or alternatively, in some implementations, external conditions associated with surfaces identified in a thermal image can be used by the system when determining an aggregate surface temperature. For example, if a couch is placed in a region of the property that receives excessive sunlight, then the system may determine that the surface temperature may not properly reflect a user's preference for ambient temperature when sitting on the couch for extensive time periods. In this example, the system may either adjust a baseline surface temperature measured for the couch, or alternatively, assign a value such that the relative contribution of the couch's surface temperature is reduced relative to surface temperatures of other surfaces that are likely to be interacted with by a user. As another example, if a surface typically has significant temperature fluctuations, then a weight assigned to surface may be lower than a surface that has less temperature fluctuations when determining an aggregate surface temperature to reduce the probability that the aggregate surface temperature is inaccurate.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed application-specific integrated circuits (ASICs).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A method performed by one or more computing devices, the method comprising:
    obtaining a thermal image of a region of a property, wherein the thermal image identifies at least a surface within the region;
    determining a surface temperature of the surface;
    identifying a set of objects predicted to be interacted with by a user associated with the property;
    determining a set of additional surface temperatures that includes a respective surface temperature for each object included in the set of objects;
    determining an ambient temperature for the region based at least on the surface temperature and the set of additional surface temperatures; and
    adjusting one or more temperature controls for the region based at least on the ambient temperature.

2. The method of claim 1, wherein the thermal image comprises an infrared image collected by an infrared camera located in the region.

3. The method of claim 1, wherein:
    the thermal image identifies a set of surfaces within the region, wherein the surface is included in the set of surfaces;
    the set of objects are identified based on the set of surfaces within the region that are identified by the thermal image; and
    identifying the set of objects further comprises:
        determining an object classification for each object included in the set of objects, and
        predicting that the set of objects are predicted to be interacted with by the user based on the object classifications.

4. The method of claim 1, wherein identifying the set of objects comprises:
    obtaining historical activity data associated with the property, wherein the historical activity data identifies a set of interactions of the user with objects included in the property;
    determining, based on the historical activity data, a respective number of interactions for each object from among the objects included in the property; and
    selecting the set of objects based on numbers of interactions determined for the objects included in the property.

5. The method of claim 3, wherein object classifications of objects included in the set of objects indicate the set of objects as representing furniture.

6. The method of claim 1, wherein adjusting the one or more temperature controls for the region comprises adjusting a set point temperature of a thermostat located in the region.

7. The method of claim 1, wherein adjusting the one or more temperature controls for the region comprises providing, to an HVAC system associated with the property, an instruction that, when received by the HVAC system, causes the HVAC system to initiate a heating operation associated with the region or a cooling operation associated with the region.

8. The method of claim 7, further comprising:
    determining that the ambient temperature is greater than a set point temperature of a thermostat located in the region; and
    wherein the instruction causes the HVAC system to initiate the cooling operation associated with the region.

9. The method of claim 7, further comprising:
    determining that the ambient temperature is less than a set point temperature of a thermostat located in the region; and
    wherein the instruction causes the HVAC system to initiate the heating operation associated with the region.

10. A system comprising:
    one or more processors; and
    one or more storage devices storing instructions that, when received by the one or more processors, causes the one or more processors to perform operations comprising:
        obtaining a thermal image of a region of a property, wherein the thermal image identifies at least a surface within the region;
        determining a surface temperature of the surface;
        identifying a set of objects predicted to be interacted with by a user associated with the property;
        determining a set of additional surface temperatures that includes a respective surface temperature for each object included in the set of objects;
        determining an ambient temperature for the region based at least on the surface temperature and the set of additional surface temperatures; and
        adjusting one or more temperature controls for the region based at least on the ambient temperature.

11. The system of claim 10, wherein:
the thermal image identifies a set of surfaces within the region, wherein the surface is included in the set of surfaces;
the set of objects are identified based on the set of surfaces within the region that are identified by the thermal image; and
identifying the set of objects further comprises:
determining an object classification for each object included in the set of objects, and
predicting that the set of objects are predicted to be interacted with by the user based on the object classifications.

12. At least one non-transitory computer-readable storage device storing instructions that are executable by one or more computing devices to perform operations comprising:
obtaining a thermal image of a region of a property, wherein the thermal image identifies at least a surface within the region;
determining a surface temperature of the surface;
identifying a set of objects predicted to be interacted with by a user associated with the property;
determining a set of additional surface temperatures that includes a respective surface temperature for each object included in the set of objects;
determining an ambient temperature for the region based at least on the surface temperature and the set of additional surface temperatures; and
adjusting one or more temperature controls for the region based at least on the ambient temperature.

13. The non-transitory computer-readable storage device of claim 12, wherein:
the thermal image identifies a set of surfaces within the region, wherein the surface is included in the set of surfaces;
the set of objects are identified based on the set of surfaces within the region that are identified by the thermal image; and
identifying the set of objects further comprises:
determining an object classification for each object included in the set of objects, and
predicting that the set of objects are predicted to be interacted with by the user based on the object classifications.

\* \* \* \* \*